United States Patent

Kiyokawa et al.

Patent Number: 5,814,672
Date of Patent: *Sep. 29, 1998

[54] STRONGLY BASIC ANION EXCHANGE RESIN AND PROCESS FOR ITS PRODUCTION

[75] Inventors: Atsuo Kiyokawa; Ryuichi Sugimoto, both of Kanagawa, Japan

[73] Assignee: Mitsubishi Chemical Corporation, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 563,825

[22] Filed: Nov. 28, 1995

[30] Foreign Application Priority Data

Dec. 5, 1994 [JP] Japan .................................. 6-301123

[51] Int. Cl.$^6$ .............................. C08F 08/32; C08F 08/24
[52] U.S. Cl. .................................. 521/32; 521/25; 521/31; 525/379
[58] Field of Search .................................. 521/32, 31, 25; 525/379

[56] References Cited

U.S. PATENT DOCUMENTS

| | | | |
|---|---|---|---|
| 2,591,574 | 4/1952 | McBurney | 521/32 |
| 2,629,170 | 2/1953 | McBurney | 521/32 |
| 3,021,288 | 2/1962 | Kressman . | |
| 4,263,407 | 4/1981 | Reed, Jr. . | |
| 4,476,304 | 10/1984 | Yokota et al. . | |
| 4,965,083 | 10/1990 | Norman, et al. . | |
| 5,350,523 | 9/1994 | Tomoi et al. . | |

FOREIGN PATENT DOCUMENTS

| | | |
|---|---|---|
| 0 432 018 | 6/1991 | European Pat. Off. . |
| 0 481 603 | 4/1992 | European Pat. Off. . |
| 1 055 638 | 10/1953 | France . |
| 1 082 407 | 5/1960 | Germany . |
| 670348 | 4/1952 | United Kingdom . |
| 679 850 | 9/1952 | United Kingdom . |
| 700 470 | 12/1953 | United Kingdom . |
| 968 432 | 9/1964 | United Kingdom . |

OTHER PUBLICATIONS

Chemical Abstracts, vol. 84, No. 20, May 17, 1976, JP–A–75 149 784, Dec. 1, 1975.
Chemical Abstracts, vol. 115, No. 20, Nov. 18, 1991, AN: 209332x, DD–A–290 896, Jun. 13, 1991.

Primary Examiner—Fred Zitomer
Attorney, Agent, or Firm—Oblon, Spivak, McClelland, Maier & Neustadt, P.C.

[57] ABSTRACT

A strongly basic anion exchange resin of gel type having trimethylamine type quaternary ammonium groups and a cross-linked three dimensional polymer structure formed by copolymerization of a monovinyl aromatic monomer with a cross-linkable aromatic monomer, wherein the water content X (wt %) of the resin with counter ions being a standard type (chlorine type) and the salt-splitting capacity Y (meq/g-Resin) are in a relation represented by the following formula (1) or (2):

$$Y \geq 0.0214X + 3.26 \qquad (1)$$

provided $50 < X \leq 75$ $$Y \geq 0.0722X + 0.711 \qquad (2)$$

provided $40 \leq X \leq 50$.

20 Claims, 2 Drawing Sheets

STRONGLY BASIC ANION EXCHANGE RESIN AND PROCESS FOR ITS PRODUCTION

The present invention relates to an anion exchange resin having a large ion exchange capacity, particularly a strongly basic anion exchange resin having a large ion exchange capacity, and a process for its production.

Ion exchange resins are used not only for purifying water but also in a wide range of industrial fields such as medicines, food products and chemical industry.

In general, an ion exchange resin has a chemical structure having cation exchange groups or anion exchange groups introduced into a cross-linked three dimensional polymer structure. As anion exchange groups, primary to tertiary amino groups and ammonium groups are, for example, well known. An anion exchange resin is usually produced by reacting a copolymer of a monovinyl aromatic monomer with a cross-linkable aromatic monomer, with a haloalkylating agent to introduce haloalkyl groups, and then reacting it with an amine.

Properties required for the anion exchange resin vary depending upon its particular purpose. However, it is commonly desired that the anion exchange resin has a proper ion exchange capacity and a proper water content.

In order to obtain an anion exchange resin having a desired water content in the above process, it is common to adjust the amount of the cross-linkable aromatic monomer. Namely, the water content of the anion exchange resin tends to decrease as the amount of the cross-linkable monomer increases. In such a case, if the amount of the cross-linkable aromatic monomer exceeds a certain level, the cross-linking density of the copolymer becomes high, which adversely affects diffusion of reagents for reaction, whereby the haloalkylation and amination tend to be insufficient, and the ion exchange capacity of the resulting anion exchange resin tends to be low.

In a case where the amount of the cross-linkable aromatic monomer is small, a fairly large amount of haloalkyl groups will be introduced even when the haloalkylation reaction is carried out under a usual condition, and by the subsequent amination reaction, it is possible to obtain an anion exchange resin having a relatively large ion exchange capacity. However, there will be problems such that the water content of the resin is high, whereby swelling and shrinkage are so large that handling tends to be difficult, and the strength tends to be inadequate.

The haloalkylation reaction may, for example, be carried out by a known method as disclosed in Organic Reactions, vol. 1, 63–73 (1946). In order to facilitate the haloalkylation reaction, it is conceivable to employ a strict condition for the haloalkylation reaction. For example, it is conceivable to employ a catalyst having a high catalytic activity or to increase the reaction temperature. However, by such a measure, a side reaction such as a cross-linking reaction by the haloalkylating agent (so-called post cross-linking or secondary cross-linking) tends to proceed simultaneously with the haloalkylation, whereby the introduced haloalkyl groups will be consumed, and it has been difficult to obtain an anion exchange resin having a sufficiently large ion exchange capacity. In the production of an anion exchange resin, it is usually considered to be undesirable that haloalkyl groups are consumed by post cross-linking, and it has been desired to employ a mild condition.

On the other hand, a technique is also known wherein the post cross-linking reaction by the haloalkylating agent is positively utilized. For example, Japanese Examined Patent Publication No. 16136/1987 proposes an adsorbent having a macronet structure produced by subjecting a polymer having a macroreticular structure to a cross-linking reaction with a polyfunctional monomer, wherein an Example is disclosed in which chloromethyl methyl ether known as a haloalkylating agent, is used as the polyfunctional monomer. The same publication discloses that it is possible to further haloalkylate the resin of the macronet structure, followed by amination to obtain an ion exchange resin. However, no Example is given in which such ion exchange groups are actually introduced. It is practically difficult to conduct haloalkylation of a resin which has already been sufficiently post cross-linked with a haloalkylating agent, while it is believed that in order to improve the properties such as absorptivity and the diffusion rate, it will be necessary to conduct the post cross-linking reaction sufficiently. Accordingly, the resulting anion exchange resin is believed to have only a small ion exchange capacity.

WO89/08993 discloses a resin obtained by chloromethylating a copolymer of a monoethylenically unsaturated monomer with a cross-linkable monomer, followed by post cross-linking and then reacting it with an amine to impart hydrophilic nature, as an adsorbent for adsorbing and removing bitter components from orange juices. From the Examples disclosed, it is apparent that such a resin is also intended for use as an adsorbent and is a resin having the post cross-linking reaction sufficiently proceeded.

In recent years, an anion exchange resin having a large ion exchange capacity is demanded in many industrial fields, since it is thereby possible to reduce the size of the packing column or to increase the capacity for treatment. Especially, a resin having a large ion exchange capacity (In the case of a strongly basic anion exchange resin, the ion exchange capacity may be represented substantially by the salt-splitting capacity) is desired which is a strongly basic anion exchange resin having quaternary ammonium groups as ion exchange groups. The salt-splitting capacities of anion exchange resins which are presently commercially available vary depending upon the water contents, but are usually within a range of from 3.3 to 4.6 meq/g at a water content of from 40 to 70%. A resin having a larger salt-splitting capacity is desired.

It is an object of the present invention to provide an anion exchange resin having practical and excellent strength and a large salt-splitting capacity, and a process for its production.

The present invention provides a strongly basic anion exchange resin of gel type having trimethylamine type quaternary ammonium groups and a cross-linked three dimensional polymer structure formed by copolymerization of a monovinyl aromatic monomer with a cross-linkable aromatic monomer, wherein the water content X (wt %) of the resin with counter ions being a standard type (chlorine type) and the salt-splitting capacity Y (meq/g-Resin) are in a relation represented by the following formula (1) or (2):

$$Y \geq 0.0214X + 3.26 \quad (1)$$

provided $50 < X \leq 75$ $$Y \geq 0.0722X + 0.711 \quad (2)$$

provided $40 \leq X \leq 50$; or
a strongly basic anion exchange resin of gel type having dimethylethanolamine type quaternary ammonium groups and a cross-linked three dimensional polymer structure formed by copolymerization of a monovinyl aromatic monomer with a cross-linkable aromatic monomer, wherein the water content X (wt %) of the resin with counter ions being a standard type (chlorine type) and the salt-splitting capacity Y (meq/g-Resin) are in a relation represented by the following formula (3) or (4):

$$Y \geq 0.0250X + 2.80 \tag{3}$$

provided 45<X≦65

$$Y \geq 0.0650X + 1.00 \tag{4}$$

provided 40≦X≦45.

The present invention also provides a process for producing a strongly basic anion exchange resin, which comprises copolymerizing a monovinyl aromatic monomer with a cross-linkable aromatic monomer, reacting the resulting cross-linked copolymer in a swelled state with a haloalkylating agent in the presence of a Friedel-Crafts catalyst, wherein in the first stage of the reaction, a haloalkylation reaction is mainly proceeded, and in the later stage of the reaction, a haloalkylation reaction and a post cross-linking reaction are simultaneously proceeded, and then reacting the haloalkylated copolymer with a tertiary amine.

Now, the present invention will be described in detail with reference to the preferred embodiments.

Figure 1:
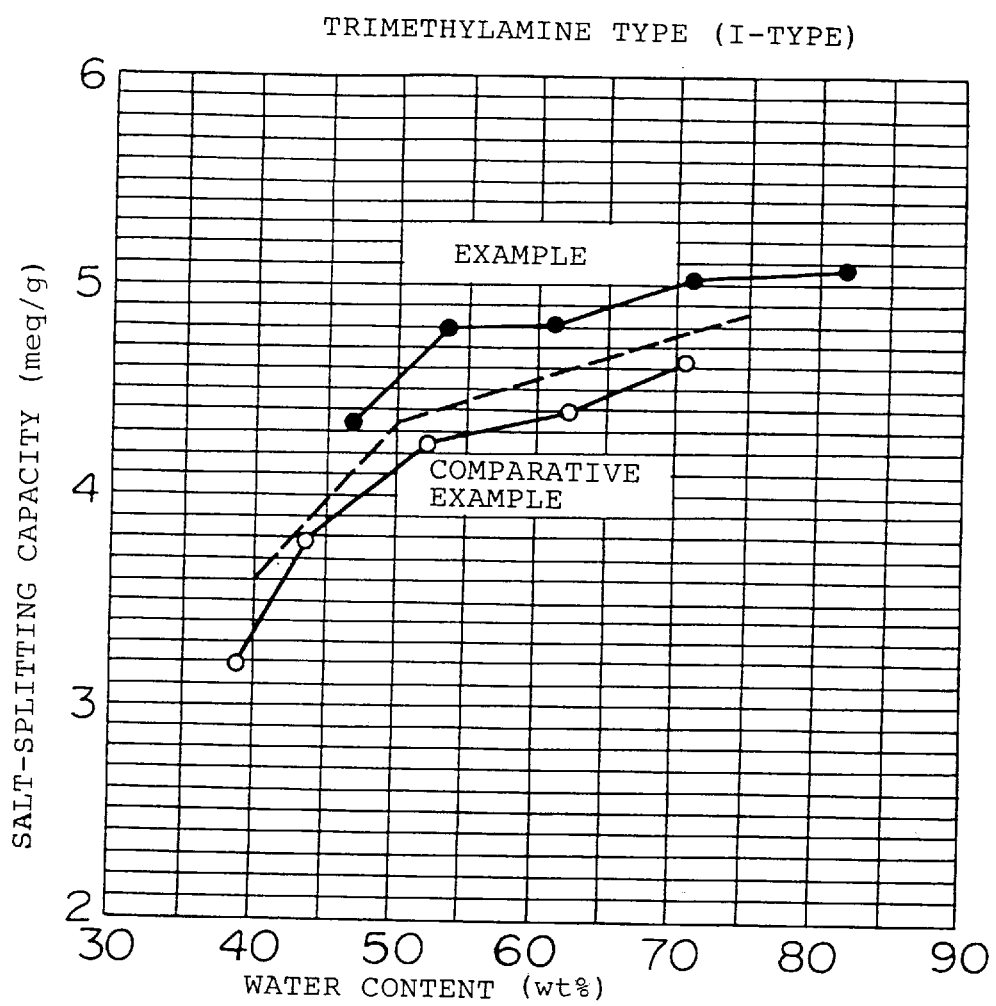
FIG. 1 is a graph showing the relation between the water content X and the salt-splitting capacity Y of a strongly basic anion exchange resin (Cl type) having trimethylamine type quaternary ammonium groups, wherein ● indicates values of Examples 1 to 5, and ○ indicates values of Comparative Examples 1 to 5. The dashed line represents the above formulas (1) and (2).

The resin of the present invention can be obtained by copolymerizing a monovinyl aromatic monomer with a cross-linkable aromatic monomer, reacting the resulting cross-linked copolymer in a swelled state with a haloalkylating agent in the presence of a Friedel-Crafts catalyst, wherein in the first stage of the reaction, a haloalkylation reaction is mainly proceeded, and in the later stage of the reaction, a haloalkylation reaction and a post cross-linking reaction are simultaneously proceeded, and then reacting the haloalkylated copolymer with a tertiary amine.

The monovinyl aromatic monomer may, for example, be styrene; an alkylstyrene such as methylstyrene or ethylstyrene; or a halogen-substituted styrene such as bromostyrene. Particularly preferred is styrene or a monomer composed mainly of styrene. The cross-linkable aromatic monomer may, for example, be divinylbenzene, trivinylbenzene, divinyltoluene, divinylnaphthalene or divinylxylene. Particularly preferred is divinylbenzene. Industrially produced divinylbenzene usually contains a substantial amount of ethylvinylbenzene as a by-product. Such divinylbenzene may also be employed in the present invention. The smaller the amount of the cross-linkable aromatic monomer is, the larger the ion exchange capacity will be, since diffusion of the reaction reagents in the cross-linked copolymer will not be hindered. However, if the amount is excessively low, the water content of the resulting anion exchange resin increases, whereby the resin will be practically difficult to handle due to excessive swelling and shrinkage. Accordingly, the amount of the cross-linkable aromatic monomer is usually from 1 to 4 wt %, preferably from 2.5 to 3.5 wt %, based on the weight of the total monomers. The copolymerization of the monovinyl aromatic monomer with the cross-linkable aromatic monomer is carried out by a conventional method by means of a radical polymerization catalyst. The radical polymerization catalyst may, for example, be dibenzoyl peroxide, lauroyl peroxide, t-butyl hydroperoxide or azobisisobutyronitrile. It is used usually in an amount of from 0.1 to 5 wt %, based on the total monomers. The polymerization system is not particularly limited, and the polymerization may be carried out by various systems such as solution polymerization, emulsion polymerization and suspension polymerization. However, suspension polymerization is preferably employed, since a beads-shaped polymer can thereby be obtained. The suspension polymerization method can be carried out usually in accordance with known reaction conditions using a solvent, dispersion stabilizer, etc. which are commonly used for the production of a polymer of this type.

Then, the copolymer of the monovinyl aromatic monomer with the cross-linkable aromatic monomer, is reacted in a swelled state with a haloalkylating agent in the presence of a Friedel-Crafts catalyst. To swell the copolymer, a swelling solvent such as dichloroethane may be employed. However, in the present invention, it is preferred to have the copolymer swelled by means of only a haloalkylating agent in order to facilitate the haloalkylation. As the Friedel-Crafts catalyst, a Lewis acid catalyst such as zinc chloride, iron(III) chloride, tin(IV) chloride or aluminum chloride, may, for example, be mentioned. To use the haloalkylating agent not only as the reagent for reaction but also as a solvent for swelling the copolymer, it is preferably the one having good affinity with the copolymer. For example, a halogen compound such as chloromethyl methyl ether, methylene chloride, bis (chloromethyl) ether, polyvinyl chloride or bis (chloromethyl)benzene may be mentioned. Most preferred among them is chloromethyl methyl ether.

The amount of the haloalkylating agent can be selected within a wide range depending upon the cross-linking degree of the copolymer and other conditions. However, it is at least an amount which is capable of sufficiently swelling the copolymer, for example, from 1 to 50 times by weight, more preferably from 2 to 20 times by weight, to the copolymer.

In the present invention, when the copolymer is reacted with the haloalkylating agent, in a first stage of the reaction, haloalkylation is mainly proceeded, and in a later stage of the reaction, haloalkylation and a post cross-linking reaction are simultaneously proceeded. Main factors which give influences over the reaction of the copolymer with the haloalkylating agent include, for example, the reaction temperature, the activity (type) and the amount of the Friedel-Crafts catalyst and the amount of the haloalkylating agent. To let the haloalkylation proceed mainly, a method may be mentioned in which a relatively mild reaction condition is employed i.e. the temperature is lowered, a catalyst having a low catalytic activity is employed, or the amount of the catalyst is reduced. On the other hand, in order to let the haloalkylation and the post cross-linking reaction proceed simultaneously, a relatively severe condition may be employed, such that the temperature is increased, a catalyst having a high catalytic activity is employed, or the amount of the catalyst is increased. Accordingly, in the present invention, a mild condition may be employed in the first stage of the reaction, and a severe condition may be employed in the later stage of the reaction. It is a primary purpose of the first stage of the reaction to introduce a sufficient amount of haloalkyl groups, and the reaction is accordingly proceeded at a relatively low temperature. The temperature may vary depending upon the type of the Friedel-Crafts catalyst, but it is usually necessary to control the temperature within a range of from room temperature to 55° C. at the highest. The purpose of the later stage of the reaction is to let the haloalkylation and the post cross-linking reaction proceed simultaneously, and a temperature higher than the one employed in the first stage of the reaction, is required accordingly. A technique to let the post cross-linking reaction proceed is disclosed also in the above-mentioned prior art reference, but such a technique is intended to improve the absorptivity and the adsorbing speed of the resulted polymer and for that purpose, the post cross-linking reaction has to be proceeded sufficiently. Accordingly, the reaction is carried out at a very high temperature at a level of from 80° to 90° C. In the present invention, for the purpose of obtaining a large ion exchange capacity and reducing the water content slightly to a desired level, the haloalkylation and the post cross-linking reaction must be proceeded simultaneously. Accordingly, the temperature in the later stage of the reaction must be controlled to a level higher than the temperature in the first stage of the reaction and not higher than 70° C. at the highest.

The reaction may be carried out in such a manner that the reaction temperature and/or the amount of the catalyst is changed stepwisely or continuously from the first stage of the reaction to the later stage of the reaction in the same reaction system.

From the viewpoint of e.g. convenience for the reaction, the most preferred is a method wherein the reaction temperature is stepwisely or continuously raised from the first stage of the reaction towards the later stage of the reaction. A preferred reaction temperature can not generally be defined, since it varies depending upon the haloalkylating agent or the catalyst for the Friedel-Crafts catalyst. However, for example, in a case where chloromethyl methyl ether is used as the haloalkylating agent and zinc chloride is used as the Friedel-Crafts catalyst, the temperature in the first stage of the reaction may be from 40° to 50° C., and the temperature in the later stage of the reaction may be from 55° to 60° C., whereby a haloalkylated polymer having a large amount of haloalkyl groups introduced, can be obtained. Here, by properly selecting e.g. the reaction time, it is possible to avoid an excessive cross-linking reaction.

The timing for transferring from the first stage of the reaction to the later stage of the reaction is a time when the haloalkylation has been sufficiently carried out. However, depending upon such conditions as the reaction temperature and the amount of the catalyst in the later stage of the reaction, it may be subsequent to a time when the haloalkylation has proceeded to some extent.

Amino groups are introduced into the haloalkylated polymer thus prepared, to obtain an anion exchange resin. Also with respect to the method of introducing amino groups, such introduction can readily be accomplished by a conventional method.

For example, the haloalkylated polymer may be suspended in a solvent and reacted with trimethylamine or dimethylethanolamine. As a solvent, water, toluene, dioxane, dimethylformamide and dichloroethane may, for example, be employed alone or in combination as a mixture.

Then, the salt type may be changed to various anion types by conventional methods to obtain anion exchange resins.

As described above, in the present invention, firstly a copolymer is prepared under such a condition that the amount of the cross-linkable aromatic monomer is lower than the amount required to obtain a resin having a desired water content in the conventional method for producing an anion exchange resin, then the polymer is haloalkylated sufficiently under such a condition that the haloalkylation reaction represented by an example of the following formula 1 preferentially proceeds, and then a post cross-linking reaction of a part of the introduced haloalkyl groups is proceeded under such condition that a post cross-linking reaction (secondary cross-linking) represented by an example of the following formula 2 and haloalkylation proceed simultaneously.

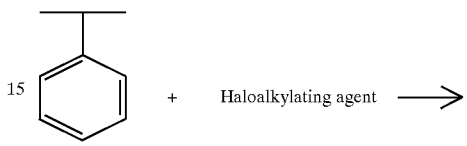

Formula 1

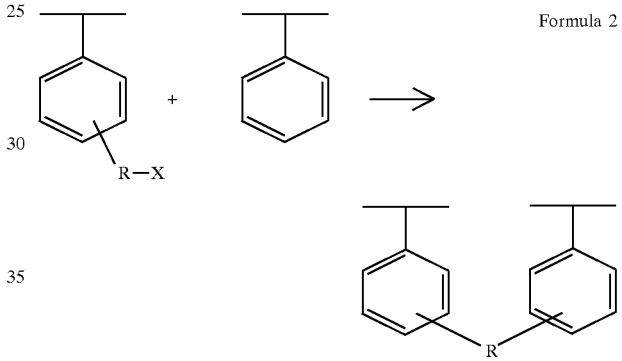

Formula 2

In the above formulas, R is an alkylene group, and X is a halogen atom.

By adding the above operations, the cross-linking density of the haloalkylated polymer can be controlled, so that when the polymer is subsequently reacted with an amine, the resulting anion exchange resin will have a desired water content. The water content of a strongly basic anion exchange resin of the present invention is usually from 40 to 75 wt %, preferably within a range of from 45 to 60 wt %, for the practical purpose.

An anion exchange resin has a nature such that the salt-splitting capacity increases with an increase of the water content. According to the present invention, the strongly basic anion exchange resin can be made an anion exchange resin having a larger salt-splitting capacity with a water content equivalent to the conventional anion exchange resin, as defined by the above formulas (1) to (4). The form of the anion exchange resin obtained by the present invention is not particularly limited, and it may, for example, be a beads form which is commonly employed, as well as various other forms such as a fiber form, a powder form, a plate form or a film form.

Figure 2:
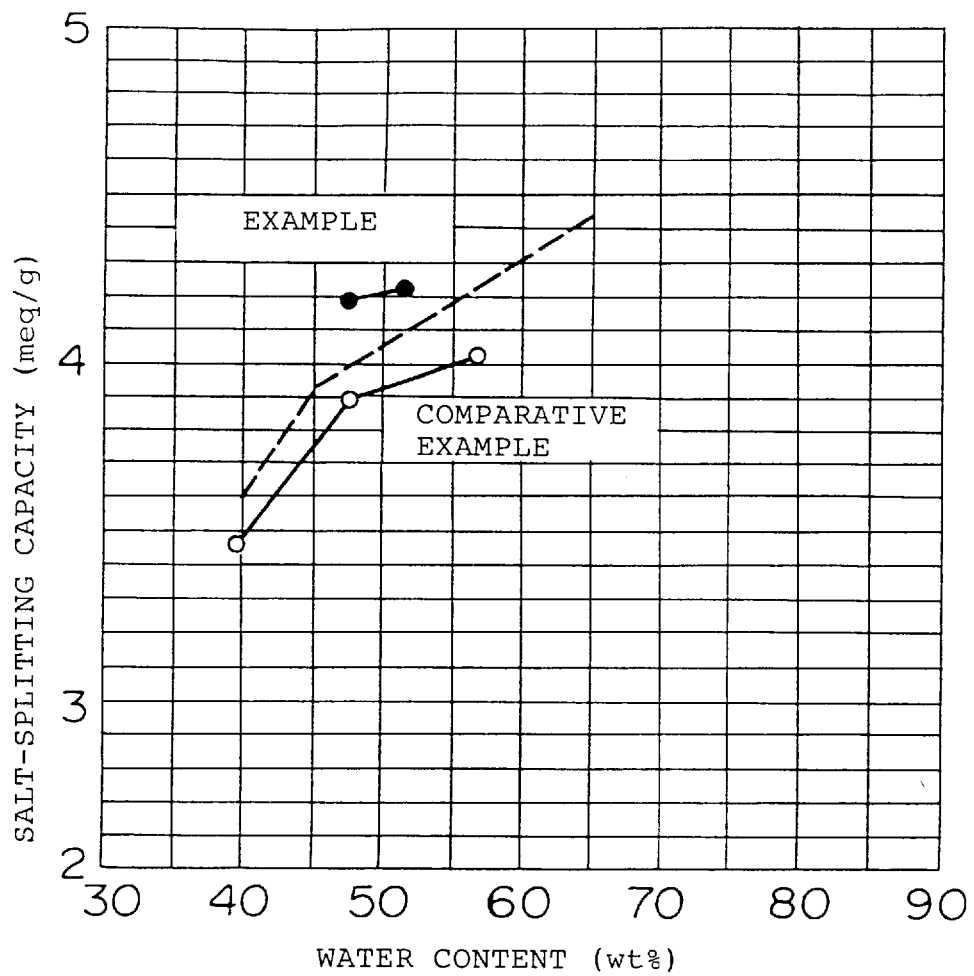
FIG. 2 is a graph showing the relation between the water content X and the salt-splitting capacity Y of a strongly basic anion exchange resin (Cl type) having dimethylethanolamine type quaternary ammonium groups, wherein ● indicates values of Examples 6 to 8, and ○ indicates values of Comparative Examples 6 to 8. The dashed line represents the above formulas (3) and (4).

The relation between the water content and the salt-splitting capacity of the strongly basic anion exchange resin of the present invention is represented by the above formulas (1) to (4). Such relations are also shown in FIGS. 1 and 2.

Now, the present invention will be described in further detail with reference to Examples. However, it should be understood that the present invention is by no means restricted by such specific Examples.

The salt-splitting capacity and the water content of the anion exchange resin were measured in accordance with the following methods.

Firstly, the anion exchange resin was packed into a column, and a 5% NaCl aqueous solution was passed therethrough in an amount of 25 times by volume of the amount of the resin to convert the anion type to a Cl type. 10 ml of this resin was taken, and a 2N—NaOH aqueous solution was passed therethrough in an amount of 75 times by volume to convert the anion type to a OH type. The resin is washed with deionized water sufficiently until the washing solution became neutral, and then a 5% NaCl aqueous solution was passed therethrough in an amount of 25 times by volume, whereby all the eluate was collected. The eluate was titrated with HCl, whereupon the salt-splitting capacity was calculated.

The resin having converted from the anion type to the Cl type was subjected to centrifugal separation to remove any attached water, whereupon the weight was measured. Then, it was dried in a constant temperature drier of 105° C.±2° C. for about 4 hours. The dried resin was left to cool in a desiccator, and the weight was measured, whereupon the water content was calculated.

EXAMPLE 1

192.92 g of styrene (reagent grade), 7.08 g (2 wt %, based on the total monomers) of divinylbenzene (industrial grade, purity: 56.5 wt %) and 1.33 g of dibenzoyl peroxide (purity: 75 wt %, wet product) were mixed and suspended in 600 g of a 0.17 wt % polyvinyl alcohol aqueous solution. The suspension was maintained at 80° C. for 8 hours with stirring to obtain 189.75 g of a copolymer (1).

30 g of the above copolymer (1) was put into a 1 l round bottomed four-necked flask, and 180 g of chloromethyl methyl ether was added thereto. The mixture was stirred at 25° C. for 30 minutes to sufficiently swell the polymer.

Then, 15 g of zinc chloride was added as a Friedel-Crafts catalyst, and the temperature of the bath was raised to 50° C., whereupon the mixture was reacted for 4 hours with stirring. Further, the temperature of the bath was raised to 60° C., and the reaction was further continued for 4 hours with stirring to obtain a chloromethylated polymer (2).

10 g of the chloromethylated polymer (2) was swelled with 50 ml of dioxane, and 44 ml of a 30 wt % trimethylamine aqueous solution was added thereto. The mixture was reacted at 50° C. for 8 hours with stirring to obtain a quaternary ammonium type anion exchange resin (Cl type, I-type) (3).

The salt-splitting capacity of the above quaternary ammonium type anion exchange resin (3) was 4.81 meq per g of the dried resin, and the water content was 61.2 wt %.

EXAMPLES 2 to 5

I-type quaternary ammonium type anion exchange resins were prepared in the same manner as in Example 1 except that styrene and divinylbenzene were copolymerized by changing the divinylbenzene content in the total monomers to 0.5, 1, 3 and 4 wt %, respectively. The salt-splitting capacities and the water contents of these resins are shown in Table 1, respectively.

COMPARATIVE EXAMPLE 1

192.92 g of styrene (reagent grade), 7.08 g (2 wt %, based on the total monomers) of divinylbenzene (industrial grade, purity: 56.5 wt %) and 1.33 g of dibenzoyl peroxide (purity: 75 wt %, wet product) were mixed and suspended in 600 g of a 0.17 wt % polyvinyl alcohol aqueous solution. This suspension was maintained at 80° C. for 8 hours with stirring to obtain 189.75 g of a copolymer (1).

To 30 g of the above copolymer, 180 g of chloromethyl methyl ether was added, and the mixture was stirred at 25° C. for 30 minutes to sufficiently swell the polymer. Then, 15 g of zinc chloride was added as a Friedel-Crafts catalyst, and while maintaining the temperature of the bath at 50° C., the mixture was reacted for 8 hours with stirring.

The chloromethylated polymer thus obtained was reacted with trimethylamine in the same manner as in Example 1 to obtain a I-type quaternary ammonium type anion exchange resin (Cl type).

The salt-splitting capacity and the water content of this resin are shown in Table 2.

COMPARATIVE EXAMPLES 2 to 5

I-type quaternary ammonium type anion exchange resins were prepared in the same manner as in Comparative Example 1 except that styrene and divinylbenzene were copolymerized by changing the divinylbenzene content in the total monomers to 4, 6, 8 and 10 wt %, respectively. The salt-splitting capacities and the water contents of these resins are shown in Table 2, respectively.

It is evident from comparison between the salt-splitting capacities and the water contents in Tables 1 that the anion exchange resins obtained by the process of the present invention have high salt-splitting capacities in all cases, as compared with the resins by conventional methods having the same levels of water content.

TABLE 1

|  | Example 1 | Example 2 | Example 3 | Example 4 | Example 5 |
|---|---|---|---|---|---|
| Divinylbenzene content in the total monomers (wt %) | 2.0 | 0.5 | 1.0 | 3.0 | 4.0 |
| Salt-splitting capacity (meq/ml) | 1.26 | 0.57 | 0.95 | 1.64 | 1.64 |
| Salt-splitting capacity (meq/g) | 4.81 | 5.07 | 5.01 | 4.79 | 4.33 |
| Water content (wt %) | 61.2 | 81.9 | 71.0 | 53.5 | 46.9 |

TABLE 2

|  | Comparative Example 1 | Comparative Example 2 | Comparative Example 3 | Comparative Example 4 | Comparative Example 5 |
|---|---|---|---|---|---|
| Divinylbenzene content in the total monomers (wt %) | 2.0 | 4.0 | 6.0 | 8.0 | 10.0 |
| Salt-splitting capacity (meq/ml) | 0.90 | 1.14 | 1.43 | 1.51 | 1.41 |
| Salt-splitting capacity | 4.63 | 4.39 | 4.24 | 3.78 | 3.19 |

TABLE 2-continued

| | Comparative Example 1 | Comparative Example 2 | Comparative Example 3 | Comparative Example 4 | Comparative Example 5 |
|---|---|---|---|---|---|
| (meq/g) | | | | | |
| Water content (wt %) | 70.7 | 62.4 | 52.2 | 43.6 | 39.0 |

The relation between the water contents and the salt-splitting capacities of the resins obtained in Examples 1 to 5 and Comparative Examples 1 to 5 is shown in FIG. 1.

EXAMPLE 6

189.38 g of styrene (reagent grade), 10.62 g (3 wt %, based on the total monomers) of divinylbenzene (industrial grade, purity; 56.5 wt %) and 1.33 g of dibenzoyl peroxide (purity: 75 wt %, wet product) were mixed and suspended in 600 g of a 0.17 wt % polyvinyl alcohol aqueous solution. The suspension was maintained at 80° C. for 8 hours with stirring to obtain a copolymer.

30 g of the copolymer was put into a 1 l round bottomed four-necked flask, and 180 g of chloromethyl methyl ether was added thereto. The mixture was stirred at 25° C. for 30 minutes to sufficiently swell the polymer.

Then, 15 g of zinc chloride was added as a Friedel-Crafts catalyst, and the mixture was reacted at 50° C. for 4 hours with stirring. Further, the temperature of the bath was raised to 60° C., and the reaction was further continued for 4 hours with stirring to obtain a chloromethylated polymer.

5 g of the above chloromethylated polymer was reacted with 10 ml of dimethylethanolamine with stirring at 50° C. for 8 hours to obtain a quaternary ammonium type anion exchange resin (Cl type, II-type).

The salt-splitting capacity of the above II-type quaternary ammonium type anion exchange resin was 4.22 meq per g of the dried resin and the water content was 51.5 wt %.

EXAMPLE 7

A II-type quaternary ammonium type anion exchange resin (Cl type) was prepared in the same manner as in Example 6 except that the divinylbenzene content in the total monomers was 3.5 wt %.

The salt-splitting capacity of the above II-type quaternary ammonium type anion exchange resin was 4.19 meq per g of the dried resin, and the water content was 47.6 wt %.

COMPARATIVE EXAMPLE 6

185.84 g of styrene (reagent grade), 14.16 g (4 wt %, based on the total monomers) of divinylbenzene (industrial grade, purity: 56.5 wt %) and 1.33 g of dibenzoyl peroxide (purity: 75 wt %, wet product) were mixed and suspended in 600 g of a 0.17 wt % polyvinyl alcohol aqueous solution. The suspension was maintained at 80° C. for 8 hours with stirring to obtain a copolymer.

30 g of the copolymer was put into a 1 l round bottomed four-necked flask, and 180 g of chloromethyl methyl ether was added thereto. The mixture was stirred at 25° C. for 30 minutes to sufficiently swell the polymer. Then, 15 g of zinc chloride was added as a Friedel-Crafts catalyst, and the mixture was reacted at 50° C. for 8 hours with stirring to obtain a chloromethylated polymer.

5 g of the above chloromethylated polymer was reacted with 10 ml of dimethylethanolamine at 50° C. for 8 hours with stirring to obtain a quaternary ammonium type anion exchange resin (Cl type, II-type).

The salt-splitting capacity of the above II-type quaternary ammonium type anion exchange resin was 4.02 meq per g of the dried resin, and the water content was 51.5 wt %.

COMPARATIVE EXAMPLES 7 and 8

II-type quaternary ammonium type anion exchange resins were prepared in the same manner as in Comparative Example 6 except that styrene and divinylbenzene were copolymerized by changing the divinylbenzene content in the total monomers to 6 and 8 wt %, respectively.

The salt-splitting capacities and the water contents of these resins are shown in Table 3.

TABLE 3

| | Comparative Example 6 | Comparative Example 7 | Comparative Example 8 |
|---|---|---|---|
| Divinylbenzene content in the total monomers (wt %) | 4.0 | 6.0 | 8.0 |
| Salt-splitting capacity (meq/g) | 4.02 | 3.89 | 3.46 |
| Water content (wt %) | 56.9 | 47.6 | 39.7 |

The relation between the water contents and the salt-splitting capacities of the resins obtained in Examples 6 and 7 and Comparative Examples 6 to 8 is shown in FIG. 2.

By producing an anion exchange resin by the process of the present invention, it is possible to obtain an anion exchange resin having a large ion exchange capacity and practical strength (water content).

By using the anion exchange resin obtained by the present invention, it is possible to obtain merits such that the size of the packed column can be reduced, and the treating ability can be improved.

What is claimed is:

1. A strongly basic anion exchange resin having trimethylamine quaternary ammonium groups and a cross-linked three dimensional polymer structure formed by copolymerization of a monovinyl aromatic monomer with a cross-linkable aromatic monomer, wherein the water content X (wt %) of the resin with counter ions being a chloride ion and the salt-splitting capacity Y (meq/g-Resin) are in a relation represented by the following formula (1) or (2):

$$Y \geq 0.0214X + 3.26 \tag{1}$$

provided $50 < X \leq 75$ $$Y \geq 0.0722X + 0.711 \tag{2}$$

provided $40 \leq X \leq 50$.

2. The strongly basic anion exchange resin according to claim 1, wherein the monovinyl aromatic monomer is styrene.

3. The strongly basic anion exchange resin according to claim 1, wherein the cross-linkable aromatic monomer is divinylbenzene.

4. The strongly basic anion exchange resin according to claim 1, wherein the cross-linkable aromatic monomer is from 1 to 4 wt % to the total amount of the monovinyl aromatic monomer and the cross-linkable aromatic monomer.

5. The strongly basic anion exchange resin according to claim 1, which is obtained by copolymerizing a monovinyl aromatic monomer with a cross-linkable aromatic monomer, reacting the resulting cross-linked copolymer in a swelled state with a haloalkylating agent in the presence of a Friedel-Crafts catalyst, wherein in the first stage of the reaction, a haloalkylation reaction is substantially proceeded at a reaction temperature not exceeding 55° C., and in the later stage of the reaction, a haloalkylation reaction and a post cross-linking reaction are simultaneously proceeded at a reaction temperature higher than the one employed in the first stage of the reaction, and then reacting the haloalkylated copolymer with a tertiary amine.

6. A strongly basic anion exchange resin having dimethylethanolamine quaternary ammonium groups and a cross-linked three dimensional polymer structure formed by copolymerization of a monovinyl aromatic monomer with a cross-linkable aromatic monomer, wherein the water content X (wt %) of the resin with counter ions being a chloride ion and the salt-splitting capacity Y (meq/g-Resin) are in a relation represented by the following formula (3) or (4):

$$Y \geq 0.0250X + 2.80 \quad (3)$$

provided $45 < X \leq 65$ $$Y \geq 0.0650X + 1.00 \quad (4)$$

provided $40 \leq X \leq 45$.

7. The strongly basic anion exchange resin according to claim 6, wherein the monovinyl aromatic monomer is styrene.

8. The strongly basic anion exchange resin according to claim 6, wherein the cross-linkable aromatic monomer is divinylbenzene.

9. The strongly basic anion exchange resin according to claim 6, wherein the cross-linkable aromatic monomer is from 1 to 4 wt % to the total amount of the monovinyl aromatic monomer and the cross-linkable aromatic monomer.

10. The strongly basic anion exchange resin according to claim 6, which is obtained by copolymerizing a monovinyl aromatic monomer with a cross-linkable aromatic monomer, reacting the resulting cross-linked copolymer in a swelled state with a haloalkylating agent in the presence of a Friedel-Crafts catalyst, wherein in the first stage of the reaction, a haloalkylation reaction is substantially proceeded at a reaction temperature not exceeding 55° C., and in the later stage of the reaction, a haloalkylation reaction and a post cross-linking reaction are simultaneously proceeded at a reaction temperature higher than the one employed in the first stage of the reaction, and then reacting the haloalkylated copolymer with a tertiary amine.

11. A process for producing a strongly basic anion exchange resin, which comprises copolymerizing a monovinyl aromatic monomer with a cross-linkable aromatic monomer, reacting the resulting cross-linked copolymer in a swelled state with a haloalkylating agent in the presence of a Friedel-Crafts catalyst, wherein in the first stage of the reaction, a haloalkylation reaction is mainly proceeded, and in the later stage of the reaction, a haloalkylation reaction and a post cross-linking reaction are simultaneously proceeded, and then reacting the haloalkylated copolymer with a tertiary amine wherein the reaction temperature at said later stage is higher than the one employed in said first stage.

12. The process for producing a strongly basic anion exchange resin according to claim 11, wherein when the cross-linked copolymer is reacted with the haloalkylating agent in the presence of a Friedel-Crafts catalyst, the reaction temperature is stepwisely changed from a temperature not exceeding 55° C. to a temperature higher than the one employed in the first stage of the reaction.

13. The process for producing a strongly basic anion exchange resin according to claim 12, wherein said temperature higher than the one employed in the first stage of the reaction is a temperature not exceeding 70° C.

14. The process for producing a strongly basic anion exchange resin according to claim 11, wherein when the cross-linked copolymer obtained by the copolymerization of a monovinyl aromatic monomer with a cross-linkable aromatic monomer, is reacted with the haloalkylating agent in the presence of a Friedel-Crafts catalyst, the cross-linked copolymer is swelled with the haloalkylating agent.

15. The process for producing a strongly basic anion exchange resin according to claim 11, wherein the monovinyl aromatic monomer is styrene.

16. The process for producing a strongly basic anion exchange resin according to claim 11, wherein the cross-linkable aromatic monomer is divinylbenzene.

17. The process for producing a strongly basic anion exchange resin according to claim 11, wherein the cross-linkable aromatic monomer is from 1 to 4 wt % to the total amount of the monovinyl aromatic monomer and the cross-linkable aromatic monomer.

18. The process for producing a strongly basic anion exchange resin according to claim 11, wherein the haloalkylating agent is chloromethyl methyl ether.

19. The process for producing a strongly basic anion exchange resin according to claim 11, which comprises copolymerizing styrene with from 1 to 4 wt %, based on the total monomers, of divinylbenzene, swelling the resulting cross-linked copolymer with chloromethyl methyl ether, subjecting it to a chloromethylation reaction in the presence of a Friedel-Crafts catalyst while maintaining it at a low temperature, then raising the temperature to let a chloromethylation reaction and a post cross-linking reaction proceed simultaneously, wherein the reaction temperature in the first stage is a temperature not exceeding 55° C., and the temperature in the later stage is temperature not exceeding 70° C., and then reacting the chloromethylated copolymer with trimethylamine or dimethylethanolamine.

20. A product prepared by a process comprising the steps of:

copolymerizing a monovinyl aromatic monomer with a cross-linkable aromatic monomer;

reacting the resulting cross-linked copolymer in a swelled state with a haloalkylating agent in the presence of a Friedel-Crafts catalyst, wherein in the first stage of the reaction, substantially a haloalkylation reaction takes place, and in the later stage of the reaction, a haloalkylation reaction and a post cross-linking reaction take place simultaneously; and reacting the haloalkylated copolymer with a tertiary amine.

* * * * *